United States Patent [19]

Lane et al.

[11] Patent Number: 5,818,388
[45] Date of Patent: Oct. 6, 1998

[54] SATELLITE COMMUNICATIONS APPARATUS USING ACTIVE REDUNDANCY

[75] Inventors: Steven O. Lane, Torrance; Bruce A. Tomei, Lakewood; William F. Davis, Long Beach, all of Calif.

[73] Assignee: Hughes Electronics Corporation, Los Angeles, Calif.

[21] Appl. No.: 659,783

[22] Filed: Jun. 6, 1996

[51] Int. Cl.⁶ .................................................. H01Q 3/22
[52] U.S. Cl. ............................................................ 342/373
[58] Field of Search ............................... 342/372, 373, 342/377, 380, 383

[56] References Cited

U.S. PATENT DOCUMENTS

| | | | |
|---|---|---|---|
| 4,618,831 | 10/1986 | Egami . | |
| 4,882,588 | 11/1989 | Renshaw et al. | 342/373 |
| 4,901,085 | 2/1990 | Spring et al. | 342/373 |
| 4,907,004 | 3/1990 | Zacharatos . | |
| 5,083,131 | 1/1992 | Julian | 342/373 |
| 5,115,248 | 5/1992 | Roederer . | |
| 5,132,694 | 7/1992 | Sreenivas | 342/373 |
| 5,530,449 | 6/1996 | Wachs et al. | 342/373 |

*Primary Examiner*—Ronald L. Biegel
*Attorney, Agent, or Firm*—Terje Gudmestad; Georgann S. Grunebach; Michael W. Sales

[57] ABSTRACT

An active redundancy system for high power satellite communications payloads that use multiple antenna beams driven by multiple power amplifiers and that require power redistribution among the beams during the lifetime of a payload uses a number of power amplifiers equal to or greater than the number of antenna feeder elements to provide extra output power at the beginning of life, instead of commonly used redundancy switches. As power amplifiers fail, the amplitude and phase of the signals driving the remaining power amplifiers are adjusted to maintain antenna performance. Power amplifiers having sufficient capacity are used to ensure that, given an anticipated number of power amplifier chain failures, performance requirements can be met at the end of life.

11 Claims, 10 Drawing Sheets

SATELLITE COMMUNICATIONS APPARATUS USING ACTIVE REDUNDANCY

TECHNICAL FIELD

This invention relates to systems that provide redundancy for high power satellite communications payloads using multiple antenna beams that require power redistribution among beams during the lifetime of a payload.

BACKGROUND ART

Existing art in the area of the present invention commonly relies on switchable redundancy schemes involving the detection of failures followed by a reconfiguration of redundancy switches to replace failed units with redundant operating units. Depending on the number of failures expected during the lifetime of a payload, complex switching schemes may be required to ensure that performance is maintained. The added redundancy switches result in additional complexity, weight and losses and may reduce the overall reliability of the payload.

A frequently used approach is to use a hybrid matrix configuration including a beam forming network that receives a beam input, provides amplitude and phase distribution weights, and outputs to a first, inverse set of inverse hybrid matrices. Outputs of the inverse hybrid matrices are connected through a first set of redundancy switches to power amplifiers.

Power amplifier outputs are connected through a second set of redundancy switches to a second set of hybrid matrices. Since the first set of hybrid matrices is the inverse of the second set, the amplitude and phase distribution at inputs of the first set of hybrid matrices are therefore the same as those of outputs of the second set. The outputs of the hybrid matrices are connected to antenna feed elements.

While the prior technique functions with a certain degree of efficiency, it does not disclose the advantages of the improved apparatus of the present invention as is hereinafter more fully described.

DISCLOSURE OF THE INVENTION

An object of the present invention is to provide active redundancy, without using redundancy switches, for high power satellite communications payloads using multiple antenna beams that require power redistribution among beams during the lifetime of a payload.

An advantage of the present invention is that problems associated with redundancy switch failures are avoided.

Another advantage of the present invention is that the weight of redundancy switches and that of a number of hybrid matrices is eliminated.

Yet another advantage of the present invention is that the complexity associated with redundancy switches and a number of matrices is avoided.

Still another advantage of the present invention is the potential of turning off some power amplifiers at the beginning of life if desired.

A feature of the present invention is that spare power amplifiers needed to replace those lost to attrition during the life of the spacecraft may be used at the beginning of life; and, since high spacecraft beginning-of-life power levels and thermal capacity are available to generate higher beginning-of-life effective isotropically radiated power, inherent spacecraft capabilities are well matched with mission utility.

In realizing the aforementioned and other objects, advantages and features, the apparatus of the present invention includes a beam forming network, which has a beam input and has a plurality of outputs. It also includes a plurality of power amplifiers, each having an input and an output. Each power amplifier input is connected to a respective one of the plurality of outputs of the beam forming network.

The present invention further includes a plurality of hybrid matrices, each having a plurality of input ports and output ports. Each input port of the hybrid matrices is connected to a respective one of the outputs of the plurality of power amplifiers. Individual hybrid matrix output ports are connected to respective feed elements of an antenna. The beam forming network adjusts the amplitude and phase of signals driving the power amplifiers to control beams radiated by the antenna.

In the present invention, each of the plurality of power amplifiers has a sufficient excess output power capacity at a beginning-of-life point to ensure that, given an anticipated maximum number of power amplifier failures, performance requirements can be met at an end-of-life point. Furthermore, additional power amplifiers can be accommodated by connecting less than the total number of hybrid matrix output ports to an antenna feed element. Thus the number of power amplifiers can be equal to or greater than the number of antenna feed elements. Any remaining output port is connected to one of a plurality of loads. The power amplifiers provide more output power at the beginning of life, and the larger number of them relative to the number of feeds increases the number of degrees of freedom with respect to beam design optimization. Further, for a given number of radiating elements, the number of power amplifiers may be increased by the addition of hybrid matrices. This allows a basic spacecraft design to be used for different mission power levels or as power system efficiency increases.

The objects, advantages and features of the present invention are readily apparent from the following detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which like reference characters indicate corresponding parts in all the views, wherein.

BEST MODE FOR CARRYING OUT THE INVENTION

Figure 1A:
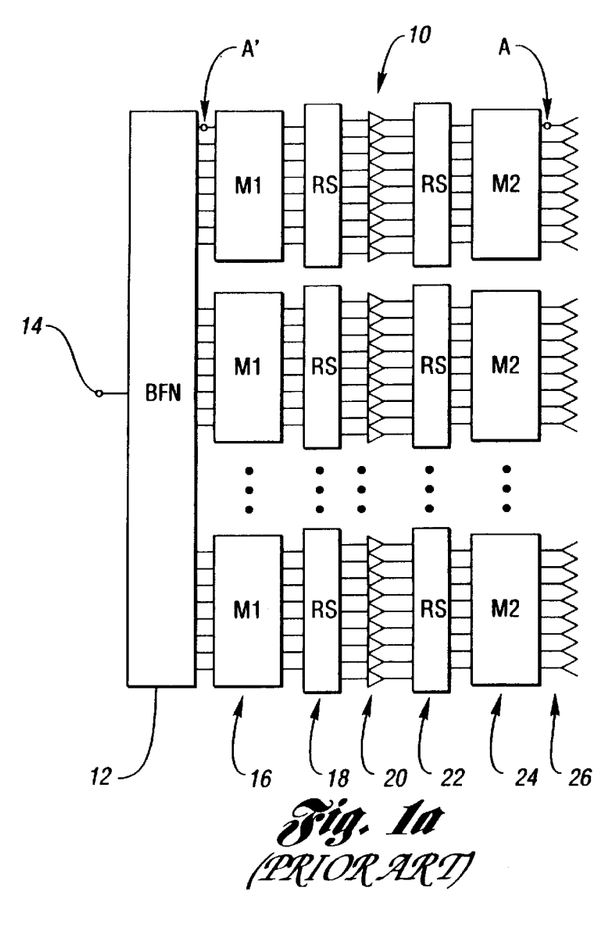
FIG. 1 is a schematic representation of a prior art apparatus using redundancy switches.
Figure 1B:
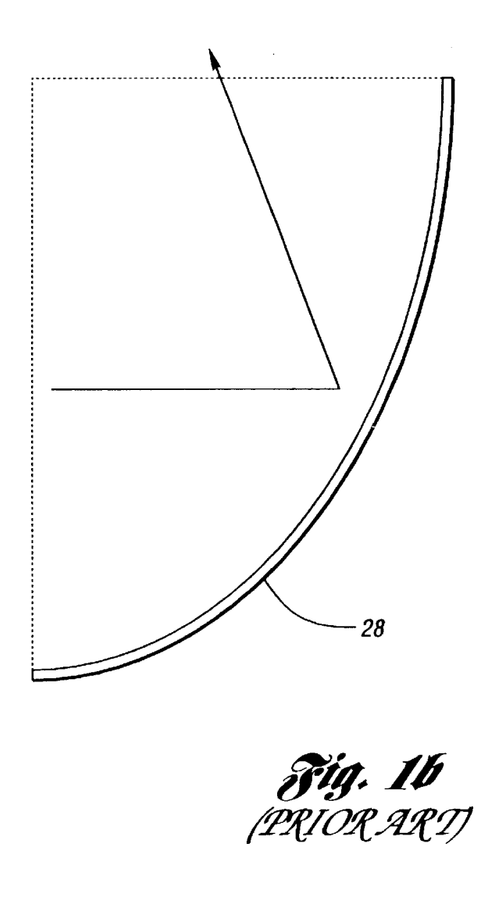

FIG. 1 of the drawing is a schematic representation of a prior art apparatus, generally indicated by reference numeral 10, for providing redundancy. It shows a hybrid matrix configuration including a beam forming network 12 that receives a beam input 14, provides amplitude and phase distribution weights, and outputs to a first, inverse set of hybrid matrices, generally indicated by reference numeral 16. The outputs of the inverse hybrid matrices 16 are connected through a first set of redundancy switches, generally indicated by reference numeral 18, to power amplifiers, generally indicated by reference numeral 20.

Outputs of the power amplifiers 20 are connected through a second set of redundancy switches, generally indicated by reference numeral 22, to a second set of hybrid matrices, generally indicated by reference numeral 24. Since the first set of hybrid matrices 16 is the inverse of the second set 24, the amplitude and phase distribution at inputs A' of the first set of hybrid matrices 16 is the same as that of outputs A of the second set of hybrid matrices 24. Outputs of the second set of hybrid matrices 24 are connected to antenna feed elements, generally indicated by reference numeral 26. A representative antenna reflector is indicated by reference numeral 28.

Figure 2:
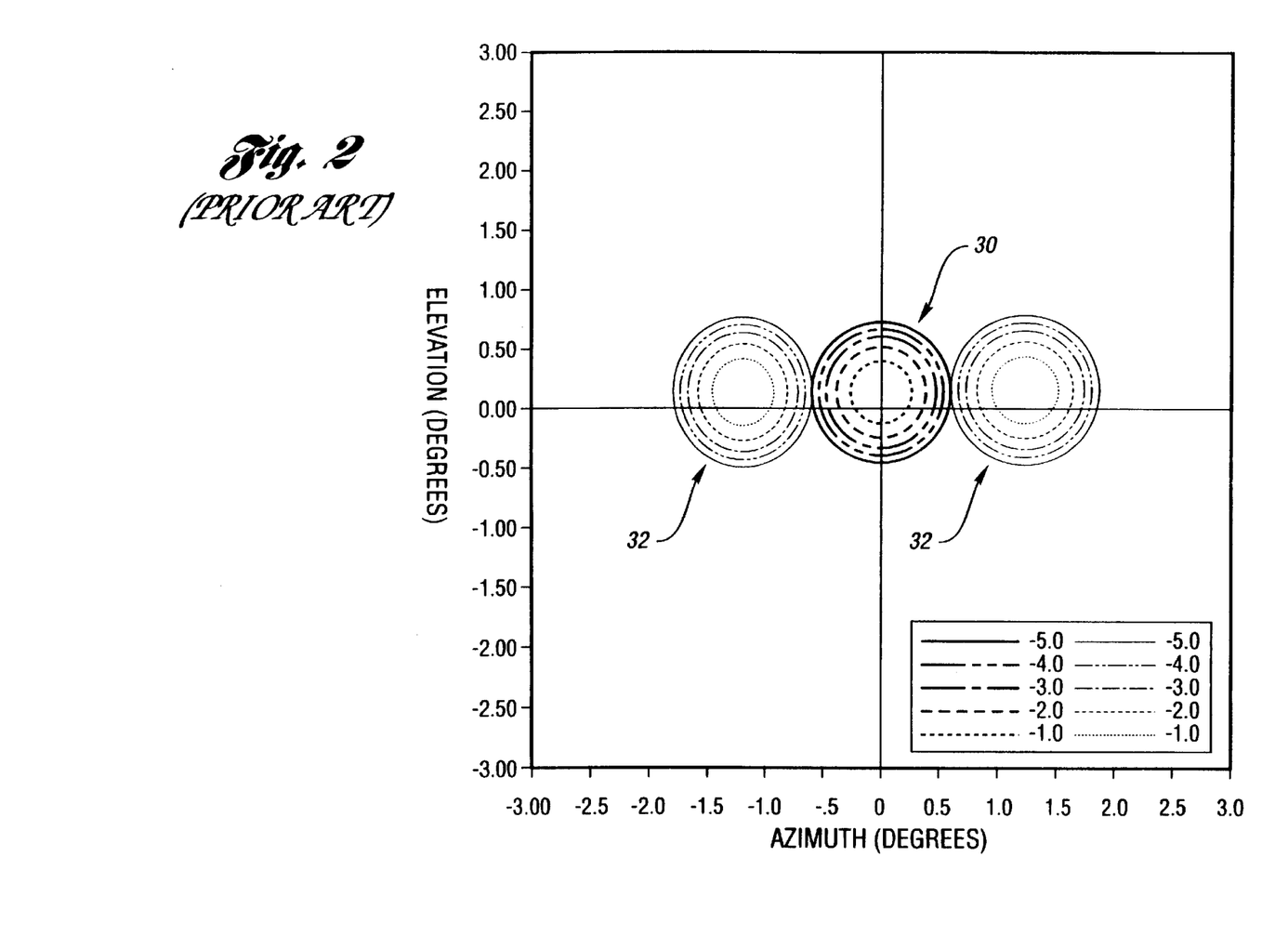
FIG. 2 is a graphic representation of individual feed patterns for a focused antenna used with the prior art apparatus shown by FIG. 1.

If only one antenna feed element 26 in a feed array is excited, an antenna pattern associated with the feed is generated in the far field. This is known as an individual feed pattern. If the antenna is focused, as shown by FIG. 2, there is little overlap between patterns of individual feeds. In loose mathematical terms, the individual patterns are said to be "orthogonal," or nearly so. In FIG. 2, the pattern of single feed is generally indicated by reference numeral 30; and the patterns of adjacent feeds are generally indicated by reference numeral 32.

If more than one antenna feed element 26 in the feed array is excited, a different antenna pattern is generated in the far field. This is known as a "beam." Since the antenna is a linear system, the beam is a linear combination of the individual feed patterns and is weighted by the amplitude and phase distribution of the individual feeds.

This is expressed by the following equation:

$$P_{beam}(\theta,\phi) = \Sigma w_i P_{Ai}(\theta,\phi)$$

where:

$P_{beam}(\theta,\phi)$ is the beam as a function of angles $\theta$ and $\phi$, $w_i$ is the complex weight of the ith feed, and $P_{Ai}(\theta,\phi)$ is the ith individual feed pattern.

The weights $W_i$ are selected by computer optimization to provide a beam with certain desired characteristics. For a beam in a given $\theta,\phi$ direction, if the individual feed patterns are mostly orthogonal, only a few antenna feed elements 26 are contributing to the beam. Furthermore, only the power amplifiers 20 associated with these feeds are able to contribute power to the beam. The size of the hybrid matrix 24 determines how many power amplifiers 20 can contribute to a single feed. FIG. 1 shows eight power amplifiers 20 contributing.

If a power amplifier 20 fails, the effect is to change the transfer function of the second set of hybrid matrices 24. It may be difficult to recover the pattern of a single feed since the two hybrid matrices 16 and 24 are no longer inverses. Error signals appear at other outputs of the second set of hybrid matrices 24, causing degradation of the beam isolation. It is possible to compensate somewhat imperfectly for these errors by reoptimizing or, more commonly, by using switches 22 to switch in an identical power amplifier 20. FIG. 1 shows each set of power amplifiers 20 having one additional power amplifier, forming a 9-for-8 redundancy configuration.

Figure 3A:
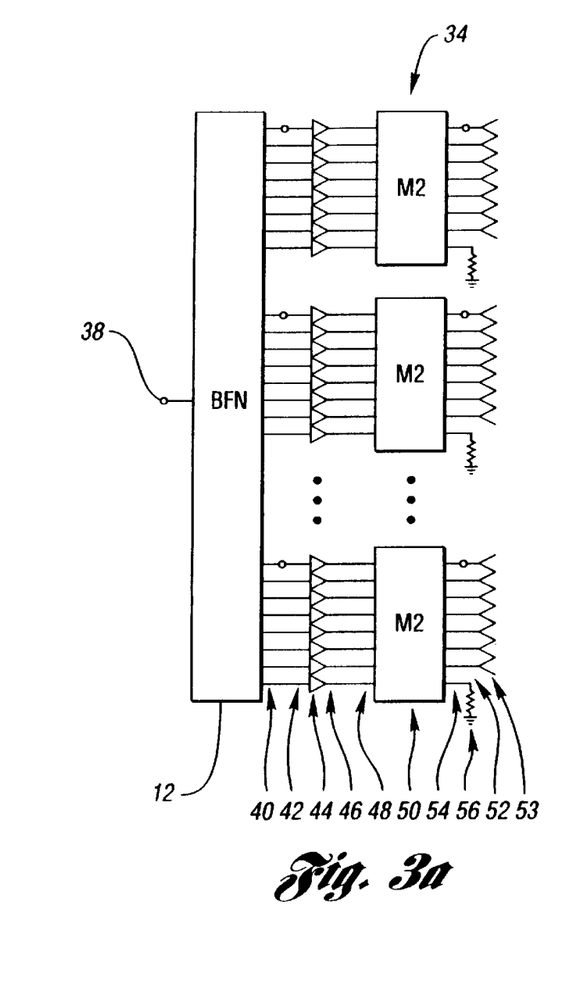
FIG. 3 is a schematic representation of the apparatus of the present invention, which uses no redundancy switches.
Figure 3B:
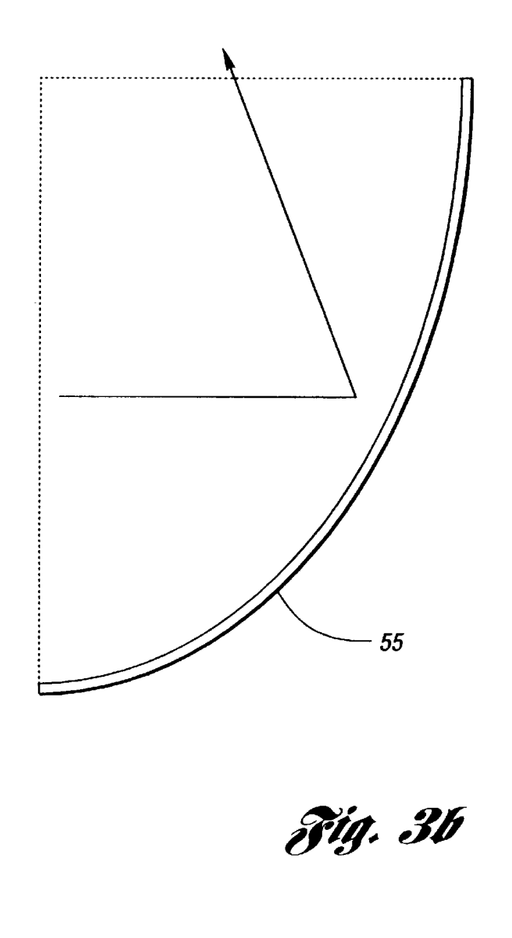

As shown by FIG. 3, in the apparatus 34 of the present invention, a different approach, identified as "active redundancy," is used. The apparatus 34 includes a beam forming network 36, which has a beam input 38 and a plurality of outputs, generally indicated by reference numeral 40. Each output 40 is connected directly to a respective one of a plurality of inputs, generally indicated by reference numeral 42, of power amplifiers, generally indicated by reference numeral 44.

Each power amplifier 44 also has an output, generally indicated by reference numeral 46, which is connected to a respective one of a plurality of input ports, generally indicated by reference numeral 48, of hybrid matrices, generally indicated by reference numeral 50. Each hybrid matrix 50 has a plurality of output ports, generally indicated by reference numeral 52, which are connected to antenna feed elements, generally indicated by reference numeral 53. A representative antenna reflector is indicated by reference numeral 55.

In general, there are more power amplifiers 44 than there are feed elements 53. Each unused output port, generally indicated by reference numeral 54, is connected to one of a plurality of loads, generally indicated by reference numeral 56. This is done to absorb stray power following a power amplifier failure and any slight unbalanced power present after initial optimization or following a reoptimization after a change of beam patterns or a power amplifier failure. The larger number of power amplifiers 44 relative to the number of feed elements effectively allows more output power at the beginning of life, and the larger number of them relative to the number of feeds increases the number of degrees of freedom with respect to beam design optimization.

Figure 4:
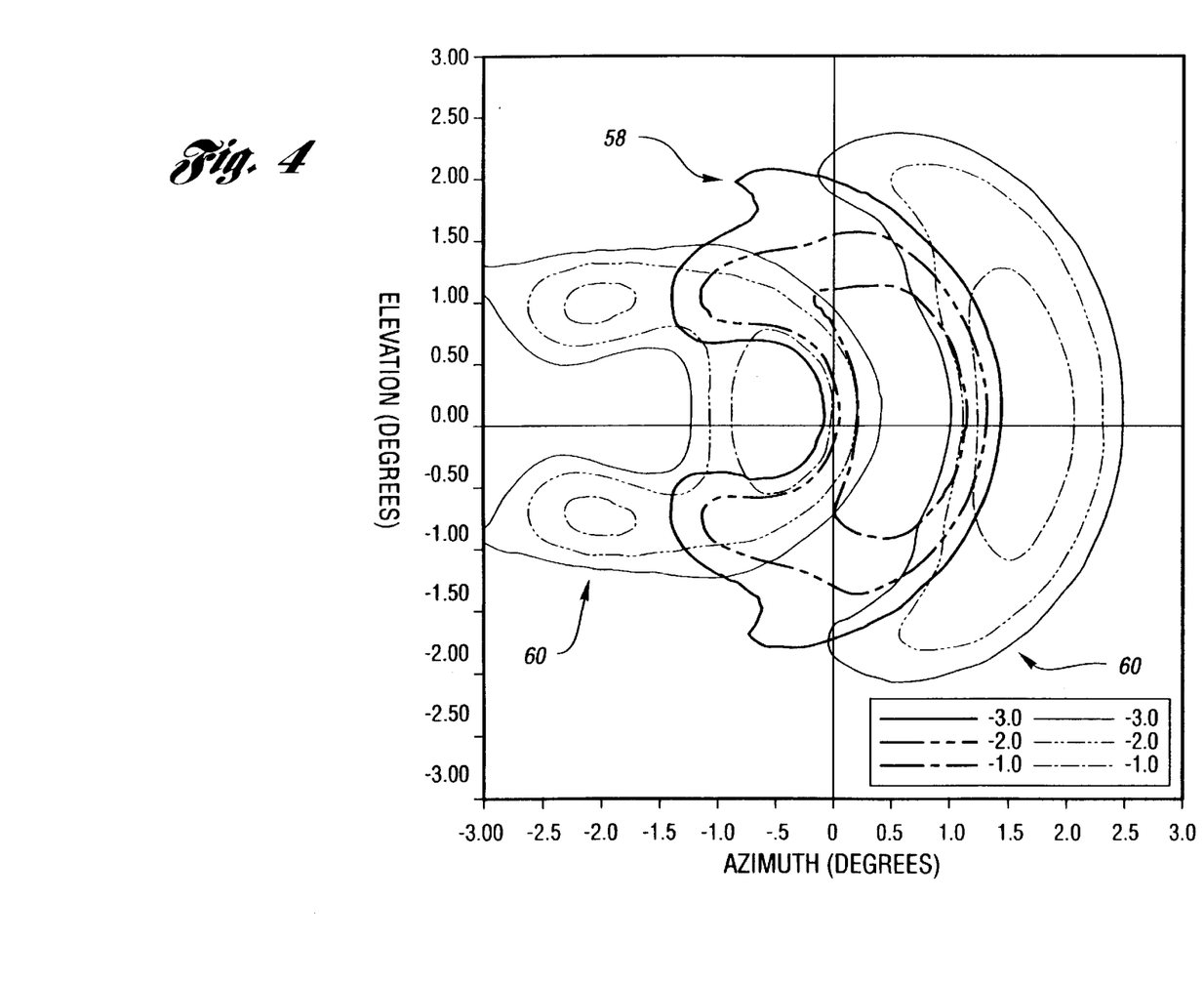
FIG. 4 is a graphic representation of individual feed patterns for a defocused antenna used with the apparatus of the present invention shown by FIG. 3.

The antenna 55 may also be defocused. It will be understood by those skilled in the art to which this apparatus relates that the apparatus functions well in a focused or defocused configuration but functions somewhat better in the latter. In the defocused configuration, the feed elements 53 are displaced from the focal point of the antenna reflector 55. As illustrated by FIG. 4, this causes considerable overlap between patterns of individual feeds. This means that the individual feed patterns are less orthogonal than they would be with a focused antenna. The pattern of single feed is generally indicated by reference numeral 58, and the patterns of adjacent feeds are generally indicated by reference numeral 60.

Figure 5:
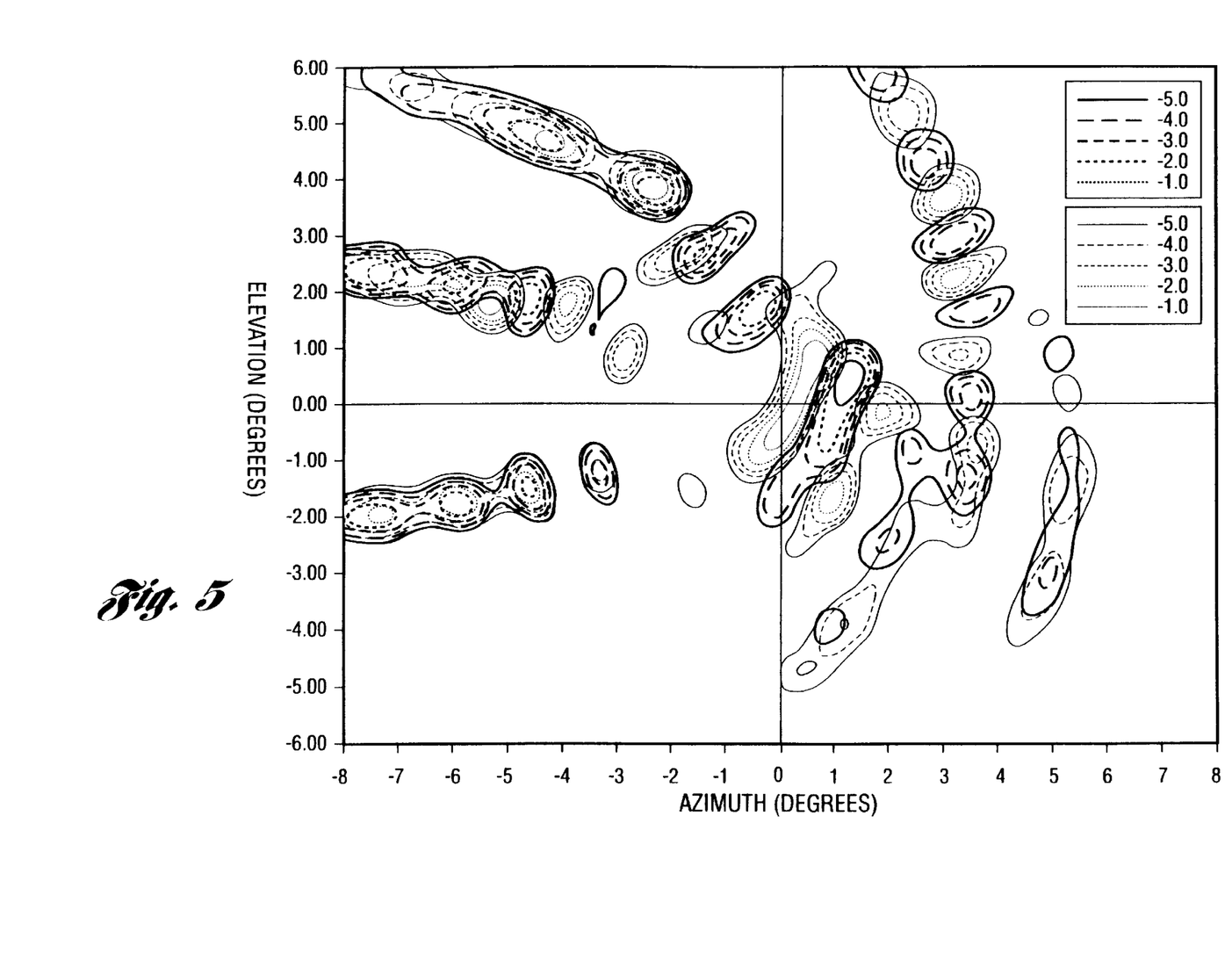
FIG. 5 is a graphic representation of typical individual patterns associated with each power amplifier for a defocused antenna used with the apparatus of the present invention shown by FIG. 3.

For any beam, many feeds contribute to the antenna pattern. Consider that there is an antenna pattern associated with the input 42 (FIG. 3) of each power amplifier 44. This is known as an individual power amplifier pattern. FIG. 5 illustrates typical individual power amplifier patterns for a defocused antenna. Being determined by hybrid matrix amplitude and phase distribution, each pattern is well known and fixed, as it would be in any fixed multibeam antenna. Again, the beam is a linear combination of individual power amplifier patterns, weighted by the amplitude and phase distribution thereof. The pattern of an individual power amplifier is generally indicated by reference numeral 62, and the patterns of adjacent power amplifiers are generally indicated by reference numeral 64.

This is expressed by the following equation:

$$P_{beam}(\theta,\phi) = \Sigma w_j P_{Bj}(\theta,\phi)$$

where:

$P_{beam}(\theta,\phi)$ is the beam as a function of angles $\theta$ and $\phi$,
$w_j$ is the complex weight of the jth power amplifier, and
$P_{Bj}(\theta,\phi)$ is the jth individual power amplifier pattern.

The beam forming network provides the amplitude and phase weights at the input to the power amplifiers to initiate beam formation. An optimizer is used to determine the weights to maximize performance while minimizing variations in the power amplifier operating point. In maximizing performance, power applied to loaded hybrid matrix output ports is automatically minimized.

There is also considerable overlap between the individual power amplifier patterns shown by FIG. 5. This means that, for any beam, many power amplifiers contribute to the antenna pattern and to the power in the beam. Flexibility of power distribution among beams is greatly increased.

If any power amplifier fails, the pattern associated with that power amplifier is unavailable for use in the optimization of the beam. To recover performance, the beam is reoptimized, neglecting the failed power amplifier pattern. However, since many power amplifier patterns are in use for any given beam, the unavailability of one causes only a small degradation of performance.

Figure 6:
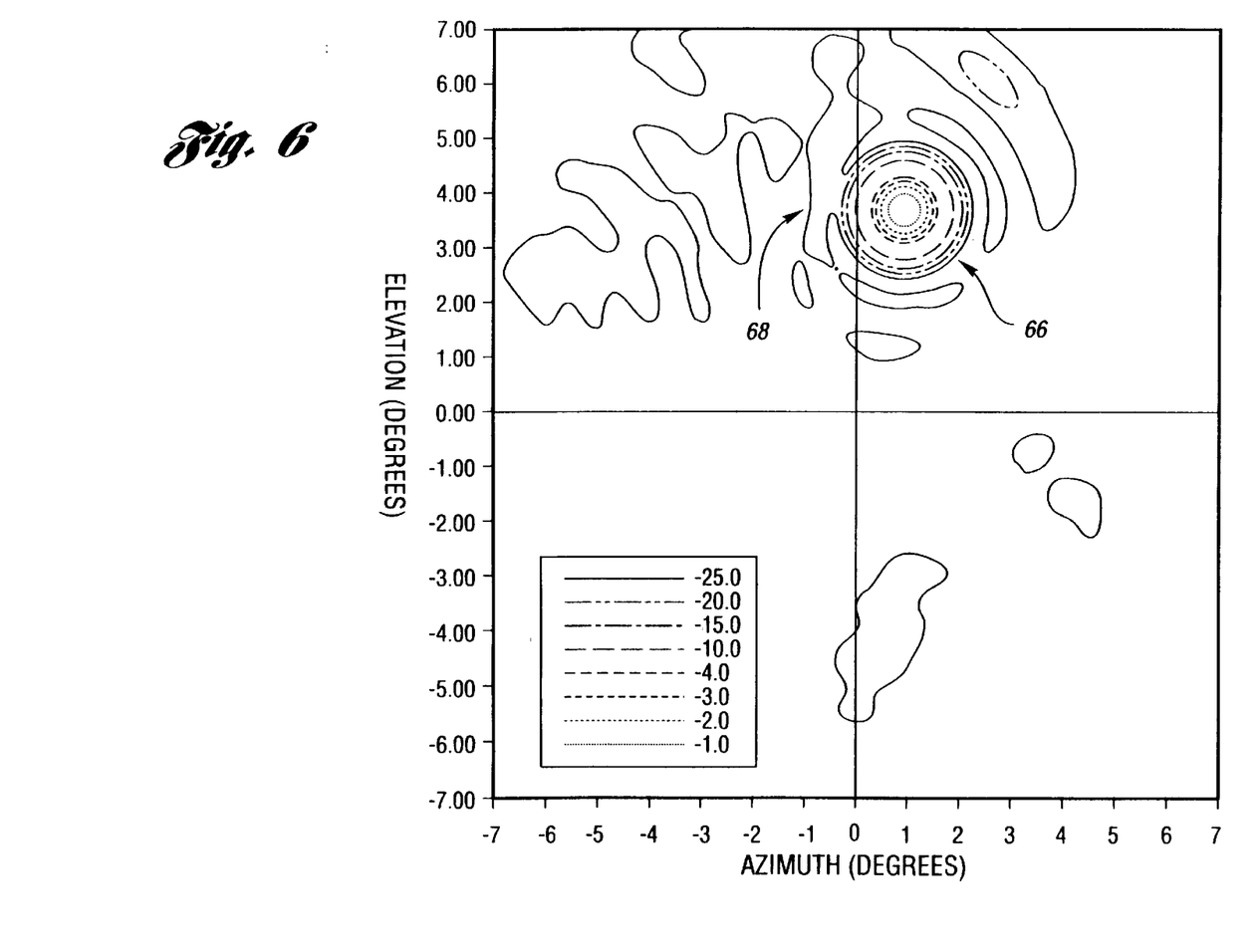
FIG. 6 is a graphic representation of an antenna pattern of a typical beam.
Figure 7:
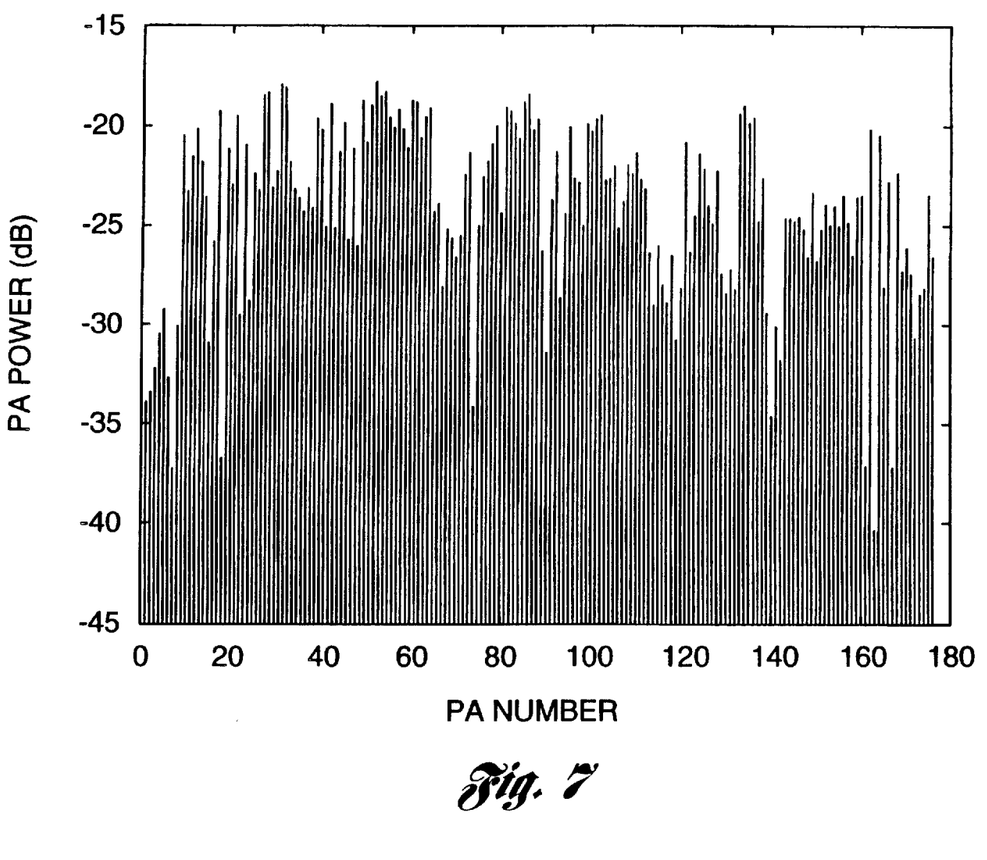
FIG. 7 is a graphic representation of the power amplifier power distribution for a typical beam during nominal operation.
Figure 8:
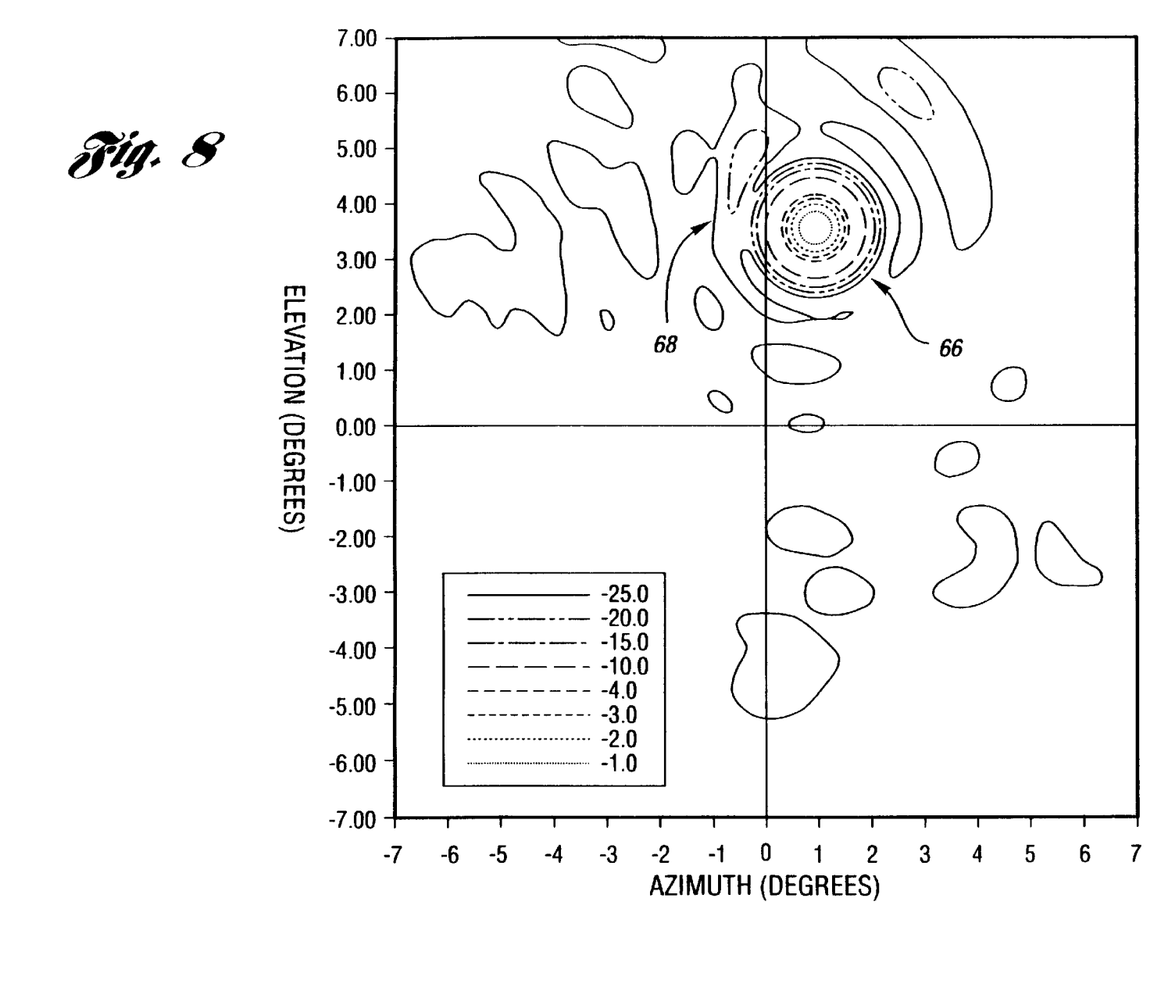
FIG. 8 is a graphic representation of an antenna pattern of a typical beam having four power amplifier failures.
Figure 9:
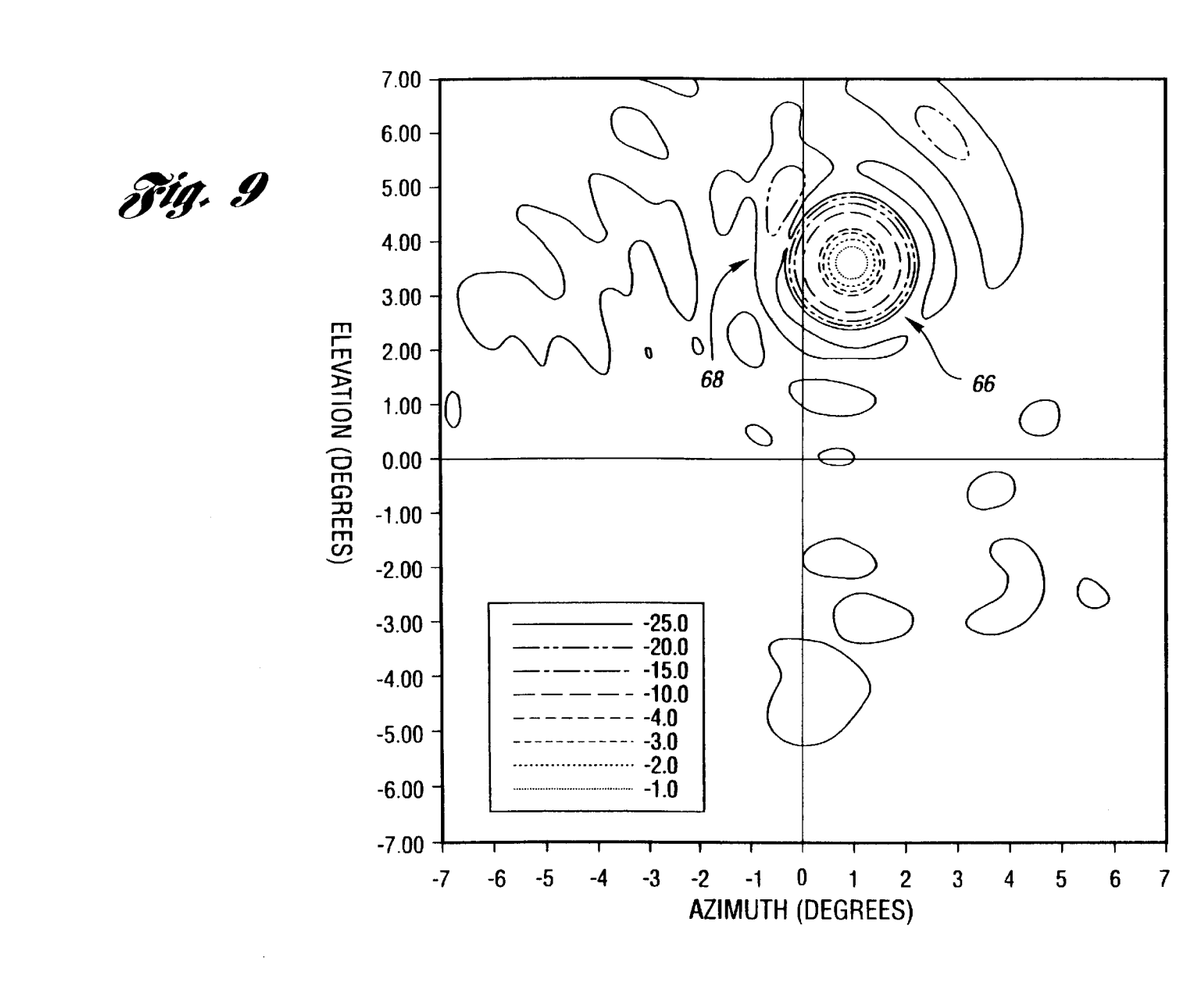
FIG. 9 is a graphic representation of an antenna pattern, after reoptimization, of a typical beam having four power amplifier failures.

FIG's. 6 through 10 illustrate examples of this. FIG. 6 shows the antenna pattern of a typical beam. FIG. 7 shows a plot of the relative output power of each power amplifier, normalized to a total of 1 watt. Note that many power amplifiers are contributing to the typical beam. FIG. 8 shows what the beam looks like if four randomly distributed power amplifiers simultaneously fail. FIG. 9 shows what the beam looks like after reoptimization. Comparison with FIG. 6 shows that the antenna pattern has not changed appreciably. In FIG's. 6, 8 and 9, the pattern of individual feeds is generally indicated by reference numeral 66, and the patterns of adjacent feeds is generally indicated by reference 68.

Figure 10:
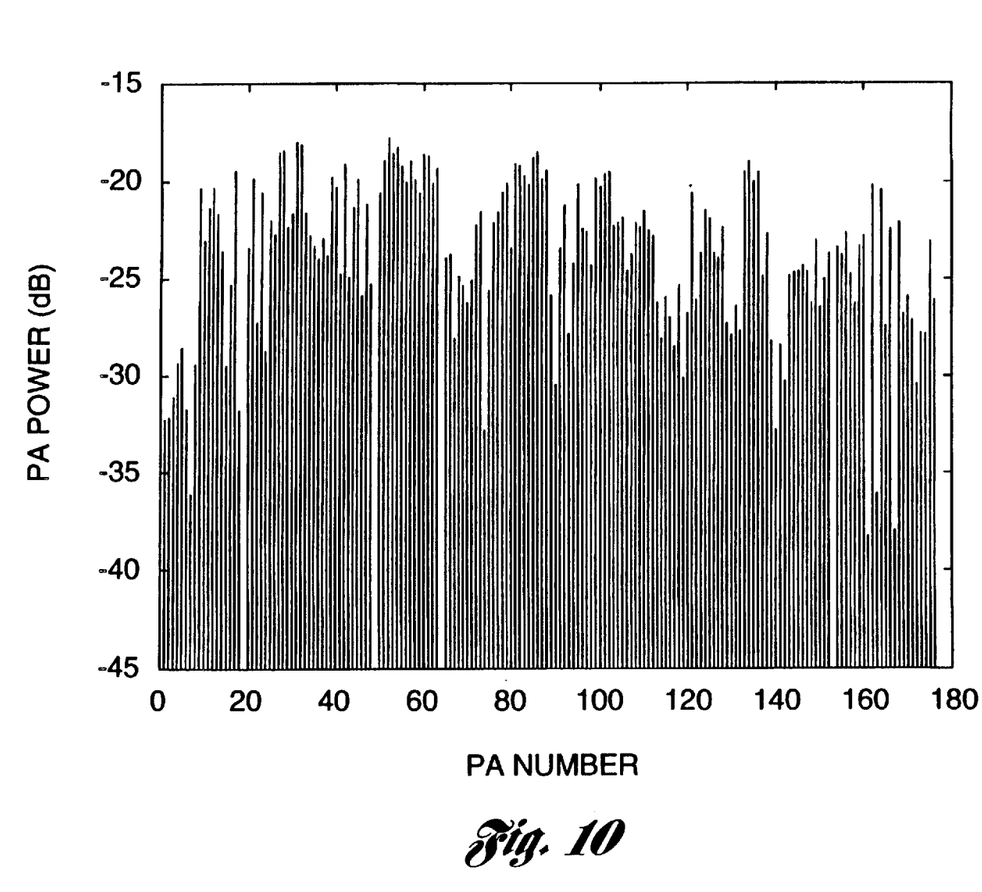
FIG. 10 is a graphic representation of the power amplifier power distribution, after reoptimization, for a typical beam having four power amplifier failures.

FIG. 10 plots the relative power amplifier power following reoptimization. Note that four power amplifiers are missing. Otherwise, however, the power distribution has not been changed significantly. The total impact to edge-of-beam directivity is 0.19 dB. This degradation is accounted for in the side lobe operating margin and aggregate effective isotropically radiated power (AEIRP) operating margin. The system being operated with many users, and thus many carriers, the AEIRP is the sum of the effective isotropically radiated power for each carrier.

Active redundancy allows the payload to be operated at beginning of life (BOL) power levels well above the end of life (EOL) guaranteed performance levels. This is accomplished by matching lifetime solar power availability and lifetime thermal radiation capability to radiated radio frequency (RF) power.

At BOL, spacecraft radiators perform at maximum efficiency. Over the lifetime of the spacecraft, some of the nonmetallic materials used during manufacture emit small quantities of material vapors as they outgas into the vacuum of space. Some of these gases condense on the cool outside surface of the radiators. This does not appreciably affect their ability to radiate effectively, that is, their emissivity is not lowered much; but their absorptivity is increased such that the summer and winter sunlight reaching the radiators is absorbed to a greater degree. This results in higher spacecraft operating temperatures.

Semiconductor cells in solar panels are likewise degraded by exposure to solar wind and by micrometeorite impacts. This results in a slow decrease in available electric power. Early in life, the excess power is simply shorted to ground and reradiated as thermal energy. With active redundancy, the spare amplifiers may be run at a nominal power during early years, resulting in an increased EIRP. In contrast, the conventional method of providing redundancy, that is, by switching in spares, limits beginning-of-life power to that available from the primary power amplifier chain operating at the end of life.

The net result is higher EIRP and higher spacecraft reliability per pound of spacecraft than conventional systems provide. Conventional payload redundancy schemes rely on spare active units that are switched into the chain to replace failed primary units. With amplitude and phase reconfigurable beams, power sharing through hybrid matrices, and defocused antenna design, a new mode of operation is possible.

Although the elements and operation of apparatus 34 of the present invention have been described with the apparatus being used to transmit electromagnetic signals, it will be understood by those skilled in the art to which this invention relates that the apparatus 34 could also be used to receive such signals. This would simply require reversing the inputs and outputs of the hybrid matrices 50, the amplifiers 44, which would then function as low noise amplifiers, and the beam forming network 36.

While the best mode for carrying out the invention has been described in detail, those familiar with the art to which this invention relates will recognize various alternative designs and embodiments, an example of which having been described in the preceding paragraph, for practicing the invention as defined by the following claims.

What is claimed is:

1. Apparatus for providing redundancy for a high power satellite communications payload using multiple antenna beams that require power redistribution among beams during the lifetime of the payload, the apparatus comprising:

a beam forming network having at least one beam input and having a plurality of outputs;

a plurality of power amplifiers, each having an input and an output, each input thereof being connected to a respective one of the plurality of outputs of the beam forming network; and a plurality of hybrid matrices, each having a plurality of input ports and output ports, each input port thereof being connected to a respective one of the outputs of the plurality of power amplifiers, individual hybrid matrix output ports being connected to a respective feed element of an antenna, the beam forming network adjusting the amplitude and phase of signals driving the power amplifiers to control beams radiated by the antenna while reducing variations in the power amplifiers respective operating points to reduce power dissipated by any loaded hybrid matrix output ports.

2. Apparatus as defined by claim 1, wherein the power amplifiers are solid state power amplifiers.

3. Apparatus as defined by claim 1, wherein each of the plurality of power amplifiers has a sufficient excess power capacity at a beginning-of-life point to ensure that performance requirements can be met at an end-of-life point, given an anticipated maximum number of power amplifier failures.

4. Apparatus as defined by claim 3, wherein the number of power amplifiers is equal to the number of antenna feed elements, each of the plurality of hybrid matrix output ports being connected to an antenna feed element.

5. Apparatus as defined by claim 3, wherein the number of power amplifiers is greater than the number of antenna feed elements, each hybrid matrix output port not being connected to an antenna feed element being connected to one of a plurality of loads.

6. Apparatus as defined by claim 3, wherein the number of power amplifiers is less than the number of antenna feed elements, each of the plurality of hybrid matrix output ports being connected to an antenna feed element.

7. The apparatus of claim 1 further comprising:
   a plurality of feed elements having inputs connected to corresponding outputs of the plurality of hybrid matrices; and
   an arcuate reflector having at least one focal point, wherein the feed elements are spaced from the reflector and positioned away from the focal point to operate in a defocused configuration.

8. A method for providing redundancy for a high power satellite communications payload system using multiple antenna beams that require power redistribution among beams during the lifetime of the payload, the system including a beam forming network having at least one beam input and a plurality of outputs; a plurality of power amplifiers, each having an input and an output, each input thereof being connected to a respective one of the plurality of outputs of the beam forming network, each power amplifier having a sufficient excess power capacity at a beginning-of-life point to ensure that, given an anticipated maximum number of power amplifier failures, performance requirements can be met at an end-of-life point, the number of power amplifiers being at least equal to the number of antenna feed elements; and a plurality of hybrid matrices, each having a plurality of input ports and output ports, each input port thereof being connected to a respective one of the outputs of the plurality of power amplifiers, individual hybrid matrix output ports being connected to a respective feed element of an antenna, each hybrid matrix output port not being connected to an antenna feed element being connected to one of a plurality of loads, the method comprising the steps of:

(a) optimizing weights of amplitude and phase to maximize performance while minimizing variations in the power amplifier operating point, thereby minimizing power applied to loaded hybrid matrix output ports and maintaining beams radiated by the antenna;

(b) determining an occurrence of a change of beam patterns or a power amplifier failure; and (c) reoptimizing, in response to the occurrence, the weights of amplitude and phase to maintain beams radiated by the antenna as required between the beginning-of-life point and the end-of-life point.

9. The method defined by claim 8, wherein, in step (a), the weight of the signal driving the power amplifiers connected by a hybrid matrix to an antenna feed element at the beginning-of-life point is adjusted so that the power levels thereof are substantially above the power levels at the end-of-life point.

10. The method defined by claim 8, wherein, in step (a), the weights of the signals driving the hybrid matrix ports not connected to an antenna feed element at the beginning-of-life point is adjusted so that the power levels thereof are substantially below the power levels of the power amplifiers that are so connected.

11. A system for providing redundancy for a high power satellite communications payload system using multiple antenna beams that require power redistribution among beams during the lifetime of the payload, the system including a beam forming network having at least one beam input and a plurality of outputs; a plurality of power amplifiers, each having an input and an output, each input thereof being connected to a respective one of the plurality of outputs of the beam forming network, each power amplifier having a sufficient excess power capacity at a beginning-of-life point to ensure that, given an anticipated maximum number of power amplifier failures, performance requirements can be met at an end-of-life point, the number of power amplifiers being at least equal to the number of antenna feed elements; and a plurality of hybrid matrices, each having a plurality of input ports and output ports, each input port thereof being connected to a respective one of the outputs of the plurality of power amplifiers, individual hybrid matrix output ports being connected to a respective feed element of an antenna, each hybrid matrix output port not being connected to an antenna feed element being connected to one of a plurality of loads, the system comprising:

means for optimizing weights of amplitude and phase to maximize performance while minimizing variations in the power amplifier operating point, thereby minimizing power applied to loaded hybrid matrix output ports and maintaining beams radiated by the antenna;

means for determining an occurrence of a change of beam patterns or a power amplifier failure; and means for reoptimizing, in response to the occurrence, the weights of amplitude and phase to maintain beams radiated by the antenna as required between the beginning-of-life point and the end-of-life point.

\* \* \* \* \*